(12) United States Patent
Hughey

(10) Patent No.: US 7,201,095 B2
(45) Date of Patent: Apr. 10, 2007

(54) VEHICLE SYSTEM TO RECAPTURE KINETIC ENERGY

(75) Inventor: Charles E Hughey, Granger, IN (US)

(73) Assignee: Pneuvolt, Inc., Granger, IN (US)

( * ) Notice: Subject to any disclaimer, the term of this patent is extended or adjusted under 35 U.S.C. 154(b) by 0 days.

(21) Appl. No.: 11/060,259

(22) Filed: Feb. 17, 2005

(65) Prior Publication Data

US 2005/0178115 A1 Aug. 18, 2005

Related U.S. Application Data

(60) Provisional application No. 60/545,051, filed on Feb. 17, 2004.

(51) Int. Cl.
*F15B 11/064* (2006.01)
*B60K 1/00* (2006.01)

(52) U.S. Cl. ............................ 91/408; 91/414
(58) Field of Classification Search .................. 60/408, 60/412, 413, 414
See application file for complete search history.

(56) References Cited

U.S. PATENT DOCUMENTS

| 3,379,008 | A | * | 4/1968 | Manganaro .................. 60/408 |
| 3,512,072 | A | * | 5/1970 | Karazija et al. .............. 290/50 |
| 4,227,587 | A | * | 10/1980 | Carman ........................ 60/414 |
| 4,413,698 | A | * | 11/1983 | Conrad et al. ............. 180/65.1 |
| 4,663,937 | A | | 5/1987 | Cullin |
| 4,679,396 | A | | 7/1987 | Heggie |
| 4,760,697 | A | | 8/1988 | Heggie et al. |
| 5,427,194 | A | | 6/1995 | Miller |
| 6,033,041 | A | | 3/2000 | Koga et al. |
| 6,054,838 | A | | 4/2000 | Tsatsis |
| 6,119,802 | A | | 9/2000 | Puett, Jr. |
| 6,222,334 | B1 | | 4/2001 | Tamagawa et al. |
| 6,454,033 | B1 | | 9/2002 | Nathan et al. |
| 6,460,332 | B1 | * | 10/2002 | Maruta et al. ................ 60/414 |
| 6,490,511 | B1 | | 12/2002 | Raftari et al. |

(Continued)

*Primary Examiner*—Thomas E. Lazo
(74) *Attorney, Agent, or Firm*—Baker & Daniels LLP

(57) ABSTRACT

A fluid drive system that can be used to drive a vehicle and has energy regeneration and storage capabilities. The fluid drive system includes an electrical energy supply source mounted on the vehicle, at least one electrical motor electrically connected to the electrical supply source, and a hydraulic pump driven that may be of the variable displacement type by the electrical motor. The fluid drive system may also include a low pressure hydraulic fluid supply tank supplying fluid to the hydraulic pump, at least one pneumatically charged accumulator tank for storing pressurized hydraulic fluid, a combination hydraulic motor and pump that may also be of the variable displacement type being alternately driven by the hydraulic pump and the pneumatically charged accumulator tank; and an electrical regeneration system for regenerating the electrical energy supply. The electrical regeneration system may be powered by hydraulic fluid from the combination electrical motor and pump. The combination hydraulic motor and pump propels the vehicle during acceleration and speed maintaining operations and may also serves as a braking mechanism during deceleration of the vehicle. The combination hydraulic motor and pump may also pump hydraulic fluid into the pneumatically charged accumulator tank during at least a portion of the time that the vehicle is decelerating. The combination hydraulic motor and pump may further pump hydraulic fluid for powering the electrical regeneration system when the pneumatically charged accumulator tank is fully pressurized. The electrical regeneration system also has the ability to recharge the electrical energy supply while the vehicle is stopped using stored recovered kinetic energy.

38 Claims, 12 Drawing Sheets

U.S. PATENT DOCUMENTS 6,497,635 B2   12/2002   Suzuki
6,518,732 B2   2/2003    Palanisami 6,725,581 B2 *   4/2004   Naruse et al. ................ 60/414

* cited by examiner

VEHICLE SYSTEM TO RECAPTURE KINETIC ENERGY

This application claims the benefit of U.S. Provisional Patent Application Ser. No. 60/545,051 filed Feb. 17, 2004, the complete disclosure of which is hereby expressly incorporated by reference.

BACKGROUND OF THE INVENTION

This invention relates to a fluid drive system for a vehicle, and in particular to a fluid drive system having energy regeneration and storage capabilities. This system employs existing technology and a novel arrangement that in one embodiment provides both hydraulic and pneumatic systems, which extract kinetic energy from the vehicle as it is decelerating or braking. The system converts the kinetic energy to both stored pressurized hydraulic fluid and to stored electrical energy, which both can be used to power the fluid drive system.

In an effort to conserve resources and reduce environmental impact, numerous vehicles and drive systems have been developed including electrical vehicles, hydraulic vehicles, and hybrid vehicles which use a combination of power sources, such as electrical power and an internal combustion engine. The challenge continues to be how to provide increased range and power for the vehicles and to increase the efficiency of energy regeneration systems and minimize power loss.

It is well known to provide both AC and DC drive motors on an electrical vehicle. Furthermore, one method that is well known for trying to increase the range of an electrical vehicle is to provide a regenerative braking system. A regenerative braking system captures a portion of the kinetic energy in a moving vehicle during deceleration. As the vehicle is decelerating, the electric motor of the vehicle is used to provide a kinetic braking force and is operated as a generator used to generate electrical energy to recharge the energy storage system. Of course, a separate generator may also be used to provide the braking force as opposed to the electric drive motor of the vehicle. The electrical energy produced by the regenerative system is stored in the vehicle energy storage system and is used to power the vehicle's electric motor to increase the range. One limitation of typical regenerative braking systems are that they can only generate electricity while the vehicle is still moving, and are not designed to generate any electricity once the vehicle has come to a stop or when the vehicle is accelerating. Also, it is believed that typical regenerative braking systems are only about 5–10% efficient in returning energy back to the batteries. Furthermore, the rate of charge to the batteries may spike immediately during regenerative braking and then decline rapidly. This may be detrimental to the life span of the batteries and associated electronics. Examples of regenerative braking systems are found in U.S. Pat. No. 6,033,041 to Koga, et al.; U.S. Pat. No. 6,222,334 to Tamagawa, et al.; U.S. Pat. No. 6,490,511 to Raftari, et al.; U.S. Pat. No. 6,497,635 to Suzuki; and U.S. Pat. No. 6,518,732 to Palanisami which are fully incorporated herein by reference.

It has also been disclosed to provide a charging system for an electrical storage system or batteries for a system, using a compressed fluid, a turbine operated by the compressed fluid, and a generator driven by the turbine, as is shown in U.S. Pat. No. 6,054,838 to Tsatsis, incorporated fully herein by reference. The compressed fluid, such as air, is stored in a pressure storage tank and is released through a venturi to raise the pressure of the fluid entering the turbine. Tsatsis also discusses providing a compressor system to provide compressed air. A motor is used to drive the compressor system. Tsatsis does not show or disclose any means, however, for generating the pressure to drive the turbine by using recycled kinetic energy from the motion of the vehicle.

Another system is disclosed in pending U.S. patent application Ser. No. 10/629,395 to Applicant filed on Jul. 29, 2003, the complete disclosure of which is hereby expressly incorporated by reference. This system discloses an electrical vehicle having a pneumatic regenerative system. The system includes an air compressor, a compressed air storage tank, a pneumatic motor, and a generator. The compressor is positively connected to a rotating assembly during the deceleration state of the vehicle to drive the compressor to fill the compressed air storage tank with compressed air. The compressed air is used to drive the pneumatic motor which in turn drives the generator for regenerating electrical batteries in the vehicle.

It is also known to use a hydraulic transmission system for powering a vehicle such as disclosed in U.S. Pat. No. 4,679,396 to Heggie, incorporated fully herein by reference. Heggie discloses a system with two variable displacement hydraulic pump units and a hydraulic unit coupled to the engine. It is also known to provide a pair of hydraulic tanks when using a hydraulic transmission system. One of the tanks is typically a low pressure or reservoir storage tank, and the other is a high pressure or accumulator tank. An accumulator is a tank that may be pressurized with nitrogen or other compressible gas and then filled with hydraulic fluid. As the fluid enters the accumulator and fills the tank, the gas is further compressed, which pressurizes the fluid. The pressurized fluid in the tank can then be used to operate a hydraulic motor. Examples of hydraulic systems employing both a reservoir tank and an accumulator tank are found in U.S. Pat. No. 4,760,697 to Heggie, et al., and U.S. Pat. No. 6,119,802 to Puett, Jr., which are fully incorporated herein by reference. Accumulator tanks in these systems are pressurized with the fluid pumped there during braking or deceleration of the vehicle to store a portion of the kinetic energy of the vehicle. The pressurized fluid is then available for assisting in powering the vehicle.

Stored kinetic energy, such as in an accumulator, may be used to provide the initial acceleration of a vehicle, which may greatly increase the range of the vehicle. In a vehicle using electrical energy, the electrical consumption is greatest in volume and rate during initial acceleration, causing most of the energy depletion and loss of range. Therefore, an accumulator assisted initial take-off system may prevent this condition by allowing for initial take-off without electrical loss or drain.

In addition, the number of batteries in an electrical vehicle must accommodate the electric demands of the vehicle, as dictated by the amount of energy required to propel the vehicle for the design range. With an accumulator system assisted take-off, as well as on board charging of electrical batteries, the number of batteries in an electrical vehicle may be minimized.

One prior art example of a fluid drive system that uses an accumulator tank to store kinetic energy as well as an on board electrical charging system is disclosed in U.S. Pat. No. 5,427,194 to Miller, which is incorporated herein by reference. The system in Miller only uses one hydraulic tank, which is a combined fluid reservoir and hydraulic accumulator. In addition, Miller discloses a fly wheel suspended by a magnetic force for driving a hydraulic motor/pump when the hydraulic accumulator source of reserve energy is exhausted. The fly wheel is driven by an electric motor receiving power from an array of electric batteries. When the vehicle stops, energy in the rotating fly wheel will continue to recharge the electrical battery through a generator attached to the shaft upon which the fly wheel rotates. Miller also discloses recharging the hydraulic accumulator using a hydraulic motor/pump when the vehicle is up to speed or coasting. Miller does not disclose being able to use the power from hydraulic motor/pump to generate electricity if the accumulator becomes fully pressurized. In addition, Miller does not disclose how to use a pneumatic system in combination with a hydraulic drive system to provide a dual energy storage system.

SUMMARY OF THE INVENTION

In one embodiment of the invention, a fluid drive system for driving a vehicle is provided and includes energy regeneration and storage capabilities. The fluid drive system includes an electrical energy supply source mounted on the vehicle, at least one electrical motor electrically connected to the electrical supply source, and a hydraulic pump that may be of the variable displacement type driven by the electrical motor. The fluid drive system may also include a low pressure hydraulic fluid supply tank supplying fluid to the hydraulic pump, a pneumatically charged accumulator tank for storing pressurized hydraulic fluid, a combination hydraulic motor and pump that may also be of the variable displacement type being alternately driven by the hydraulic pump and the pneumatically charged accumulator tank; and an electrical regeneration system for regenerating the electrical energy supply. The electrical regeneration system may be powered by hydraulic fluid pumped by said combination hydraulic motor and pump.

In one embodiment, the combination hydraulic motor and pump propels the vehicle during acceleration and speed maintaining operations. The combination hydraulic motor and pump may also serve as a braking mechanism during deceleration of the vehicle. The combination hydraulic motor and pump may also pump hydraulic fluid into the pneumatically charged accumulator tank during at least a portion of the time that the vehicle is decelerating. The combination hydraulic motor and pump may further pump hydraulic fluid for powering the electrical regeneration system when the pneumatically charged accumulator tank is fully pressurized.

The fluid drive system may further include a second hydraulic motor, and the electrical regeneration system may include an air compressor driven by the second hydraulic motor. The electrical regeneration system may further include a compressed air storage tank, an air motor and an electrical generator. The air compressor may supply compressed air to the compressed air storage tank, and compressed air from the compressed air storage tank may drive the air motor. The air motor may then drive the electrical generator to recharge the electrical energy supply source.

In one embodiment, compressed air from the compressed air storage tank continues to drive the air motor and the electrical generator to recharge the electrical energy supply source after the vehicle has come to a stop.

Also, in one embodiment, the air motor cools the hydraulic fluid before being returned to the low pressure hydraulic fluid supply tank.

It is also a feature of the invention to provide a fluid drive system having energy regeneration and storage capabilities for driving a vehicle that in one embodiment includes an electrical energy supply source mounted on the vehicle, at least one electrical motor electrically connected to the electrical supply source, a hydraulic pump driven by the electric motor, and at least one hydraulic fluid tank supplying fluid to the hydraulic pump. The fluid drive system may also include a first hydraulic motor connected to and driving a wheel of the vehicle, a second hydraulic motor, and an electrical regeneration system for regenerating the electrical energy supply. The second hydraulic motor may drive the electrical regeneration system.

In one embodiment, the electrical regeneration system includes pneumatic components. The pneumatic components may include an air compressor, a compressed air storage tank, and an air motor. The air compressor may provide compressed air to the compressed air storage tank, and compressed air from the compressed air storage tank may drive the air motor. The air compressor may be driven by the second hydraulic motor.

The electrical regeneration system may also include an air motor, and the air motor may cool the hydraulic fluid before being returned to the hydraulic fluid tank.

In one embodiment, the hydraulic fluid tank is a combined fluid reservoir and hydraulic accumulator system for both supplying hydraulic fluid through said first hydraulic motor and for storing pressurized fluid accumulated during periods of deceleration of the vehicle.

In another embodiment, the fluid drive system further includes a second hydraulic fluid tank. The said second hydraulic fluid tank is a pneumatically charged accumulator tank for storing pressurized hydraulic fluid. The first hydraulic motor serves as a pump when the vehicle is decelerating and pumps hydraulic fluid into the second hydraulic fluid tank. The first hydraulic motor may also pump hydraulic fluid to power the second hydraulic motor during at least a portion of the time that the vehicle is decelerating.

It is a further feature of the invention to provide a fluid drive system having energy regeneration and storage capabilities for driving a vehicle that in one embodiment includes an electrical energy supply source mounted on the vehicle, at least one electrical motor electrically connected to the electrical supply source, a hydraulic pump driven by said electric motor, at least one hydraulic fluid tank supplying fluid to the hydraulic pump, and a combination hydraulic motor and pump drivingly connected to and driving a wheel of the vehicle. The fluid drive system may also include an electrical regeneration system including an air motor for regenerating the electrical energy supply. The electrical regeneration system may be powered by hydraulic fluid from the combination electrical motor and pump, and the air motor may cool the hydraulic fluid before being returned to the hydraulic fluid supply tank.

In one embodiment, the electrical regeneration system further includes an air compressor, a compressed air storage tank, and an electrical generator. The air compressor supplies compressed air to the compressed air storage tank, and compressed air from the compressed air storage tank drives the air motor. The air motor may drive an electrical generator to recharge the electrical energy supply source.

In another embodiment, the fluid drive system further includes a second hydraulic fluid tank, which is a pneumatically charged accumulator tank for storing pressurized hydraulic fluid. The first hydraulic motor may function as a pump during deceleration of the vehicle and pump hydraulic fluid into the second hydraulic fluid tank. During initial acceleration of the vehicle, the fluid may first be provided from the second hydraulic fluid tank for powering the first hydraulic motor and subsequently from the hydraulic pump driven by the electrical motor when pressurized fluid has been exhausted from the second hydraulic fluid tank. The first hydraulic motor may pump hydraulic fluid for powering the second hydraulic motor when the second hydraulic fluid tank is fully pressurized.

In one embodiment, the electrical regeneration system continues to regenerate the electrical energy supply system after the vehicle has come to a stop. The electrical energy supply system may include an air compressor that provides power to recharge the electrical energy supply source after the vehicle has come to a stop.

In yet another embodiment of the invention, a fluid drive system having energy regeneration and storage capabilities for driving a vehicle is provided that includes an electrical energy supply source mounted onto a vehicle; at least one electrical motor electrically connected to the electrical energy supply source; at least two combination hydraulic pump/motors, one of said hydraulic pump/motors connected to the electric motor and the other hydraulic pump/motor propelling the vehicle; at least one hydraulic fluid tank supplying fluid to the hydraulic pump/motors; and an electrical regeneration system for regenerating the electrical energy supply, wherein the other hydraulic pump/motor pumps hydraulic fluid to power the electrical regeneration system during at least a portion of the time that the vehicle is decelerating.

The other hydraulic pump/motor may pull hydraulic fluid from the fluid supply tank through the one hydraulic pump/motor during deceleration. The one hydraulic pump/motor may power the electrical motor, which acts as a generator to recharge the electrical energy supply source while the other hydraulic pump/motor is providing power when the vehicle is decelerating.

The fluid drive system may further include a second hydraulic fluid tank, the second hydraulic fluid tank being a pneumatically charged accumulator tank for storing pressurized hydraulic fluid. The second hydraulic fluid tank may store pressurized hydraulic fluid from the other hydraulic pump/motor during at least a portion of the time that the vehicle is decelerating. Pressurized hydraulic fluid from the second hydraulic fluid tank is used to assist in accelerating the vehicle. The pressurized hydraulic fluid in the second hydraulic fluid tank may also cause the one hydraulic pump/motor to power the electric motor to regenerate electricity while also assisting with acceleration. The hydraulic pump/motors may be of a variable displacement type.

The fluid drive system may further include a third hydraulic fluid tank that may be a pneumatically charged accumulator tank for storing pressurized hydraulic fluid. The third accumulator tank may receive pressurized hydraulic fluid from the other hydraulic pump/motor during at least a portion of the time the vehicle is decelerating, and pressurized fluid from the third hydraulic fluid tank may power the one hydraulic pump/motor to turn the electric motor and recharge the electrical energy supply source during at least a portion of the time the vehicle is motionless. The hydraulic fluid tank may have a smaller capacity than the second hydraulic fluid tank.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein.

Figure 1:
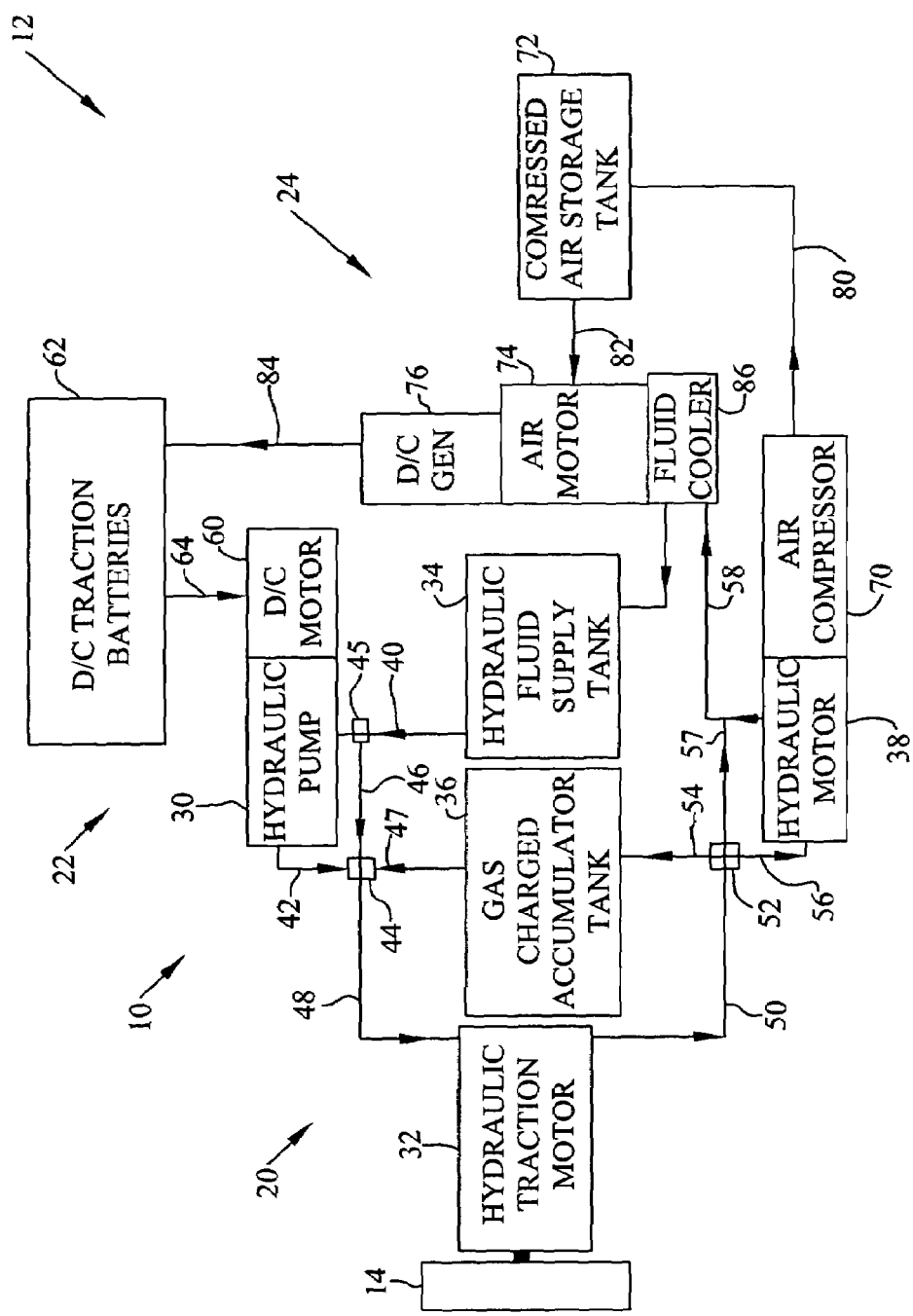
FIG. 1 is a schematic diagram of the fluid drive system of the present invention having energy regeneration and storage capabilities.
Figure 2:
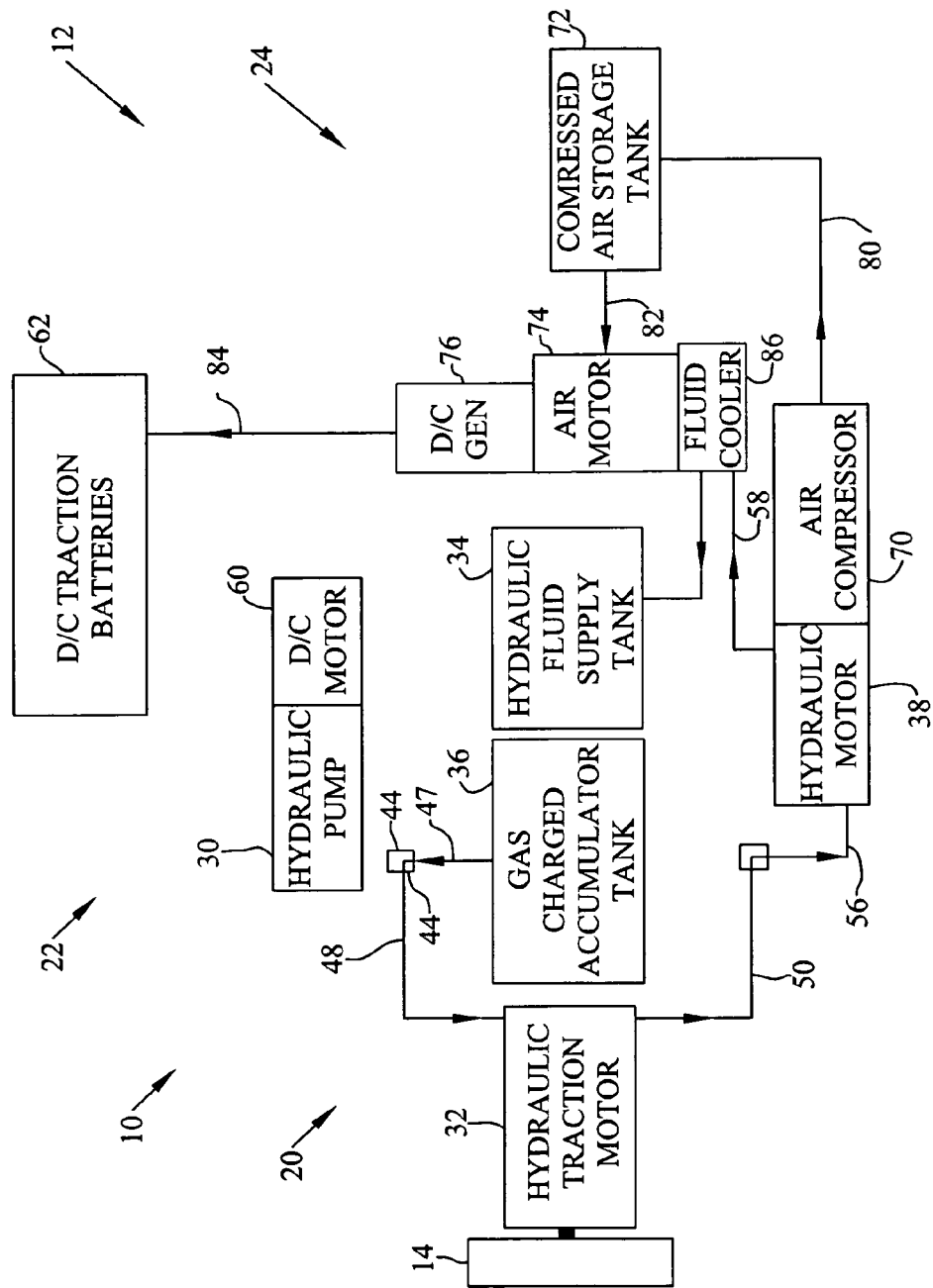
FIG. 2 is a schematic diagram of the fluid drive system of FIG. 1 showing an aspect of the operation of the system during acceleration.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, in particular forms, but such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which will be described below. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Referring now to FIG. 1, a fluid drive system generally indicated as 10 is used to drive or propel a vehicle generally indicated as 12, which has a drive wheel 14. Drive system 10 has energy regeneration and storage capabilities and includes fluid or hydraulic components generally indicated as 20, electrical energy supply and drive components generally indicated as 22, and an electrical regeneration system generally indicated as 24 for regenerating the electrical energy supply.

Fluid components 20 include a hydraulic pump 30, a hydraulic traction motor 32, a hydraulic fluid supply tank 34, a second hydraulic fluid supply tank 36, and a second hydraulic motor 38, all of which are known. In the embodiment shown, hydraulic fluid supply tank 36 is a high pressure gas or pneumatically charged accumulator tank for storing pressurized hydraulic fluid, and supply tank 34 is a low pressure reservoir type tank. Hydraulic traction motor 32 is powered by hydraulic fluid received from either hydraulic pump 30 or pneumatically charged accumulator tank 36 as discussed in further detail below.

Fluid drive system 10 also includes numerous fluid or hydraulic lines and valves for connecting fluid components 20. The fluid lines include a fluid feed line 40 connecting hydraulic fluid supply tank 34 and hydraulic pump 30 and a fluid supply line 42 extending from hydraulic pump 30 to a fluid valve 44. The system also includes a fluid valve 45 and an alternate fluid line 46 for bypassing hydraulic pump 30 as discussed below. Another fluid supply line 47 extends from pneumatically charged accumulator tank 36 to valve 44, and a fluid supply line 48 extends from valve 44 to supply pressurized hydraulic fluid to drive hydraulic traction motor 32. A fluid outlet line 50 extends from hydraulic traction motor 32 to another fluid valve 52. Fluid outlet line 50 branches out at fluid valve 52 into one branch 54 connected to the pneumatically charged accumulator tank 36, a branch 56 connected to hydraulic motor 38, and another branch 57 for bypassing hydraulic motor 38. A return fluid line 58 returns fluid back to hydraulic fluid supply tank 34.

Electrical energy supply and drive components 22 include a D/C motor 60 for driving hydraulic pump 30 and a battery array 62 for providing electrical energy to D/C motor 60. In one embodiment, battery array 62 may include lithium-ion batteries. Electrical lines 64 connect battery array 62 to D/C motor 60.

Electrical regeneration system 24 includes an air compressor 70, which is powered by hydraulic motor 38, a compressed air storage tank 72, an air motor 74, and a D/C generator 76, which is driven by air motor 74. The D/C generator 76 is used to recharge battery array 62, as described more fully below. The electrical regeneration system 24 also includes an air line 80 that connects air compressor 70 with compressed air storage tank 72 and another air line 82 for feeding compressed air from storage tank 72 to air motor 74. Electrical regeneration system 24 also includes electrical lines 84 electrically connecting D/C generator 76 to battery array 62 for providing the charge thereto. It should also be noted that electrical regeneration system 24 may include a fluid cooler 86 through which fluid return line 58 passes in order to cool the hydraulic fluid down using exhaust air discharged from air motor 74 before the hydraulic fluid is returned to supply tank 34.

The operation of fluid drive system 10 can best be appreciated by referring to FIGS. 2–6. First referring to FIG. 2, during the initial acceleration, vehicle 12 will be powered by hydraulic fluid from pneumatically charged accumulator tank 36, provided there is an initial charge of pressurized hydraulic fluid in the tank. While there is pressurized fluid in the accumulator tank 36, hydraulic pump 30 will not be required, and valve 44 will therefore be set such that lines 42 and 46 are closed off and line 47 is open to line 48 for providing the fluid to drive hydraulic motor 32 from accumulator tank 36. Fluid will exit hydraulic motor 32 through fluid outlet line 50, and while accumulator tank 36 is providing the fluid for driving the hydraulic motor 32, valve 52 will close off lines 54 to the accumulator tank and bypass line 57 and direct the hydraulic fluid through line 56 to hydraulic motor 38. Hydraulic motor 38 is connected to and drives air compressor 70, which in turn provides compressed air to storage tank 72 through air line 80. Compressed air in storage tank 72 is used to drive air motor 74, which in turn drives D/C generator 76 to replenish the electrical charge in battery 62 through electrical lines 84. As noted above, hydraulic fluid exiting hydraulic motor 38 will travel through fluid return line 58 into supply tank 34 through fluid cooler 86. While air motor 74 is running, exhausted air from the air motor will reduce the temperature of the hydraulic fluid returning to supply tank 34.

Figure 3:
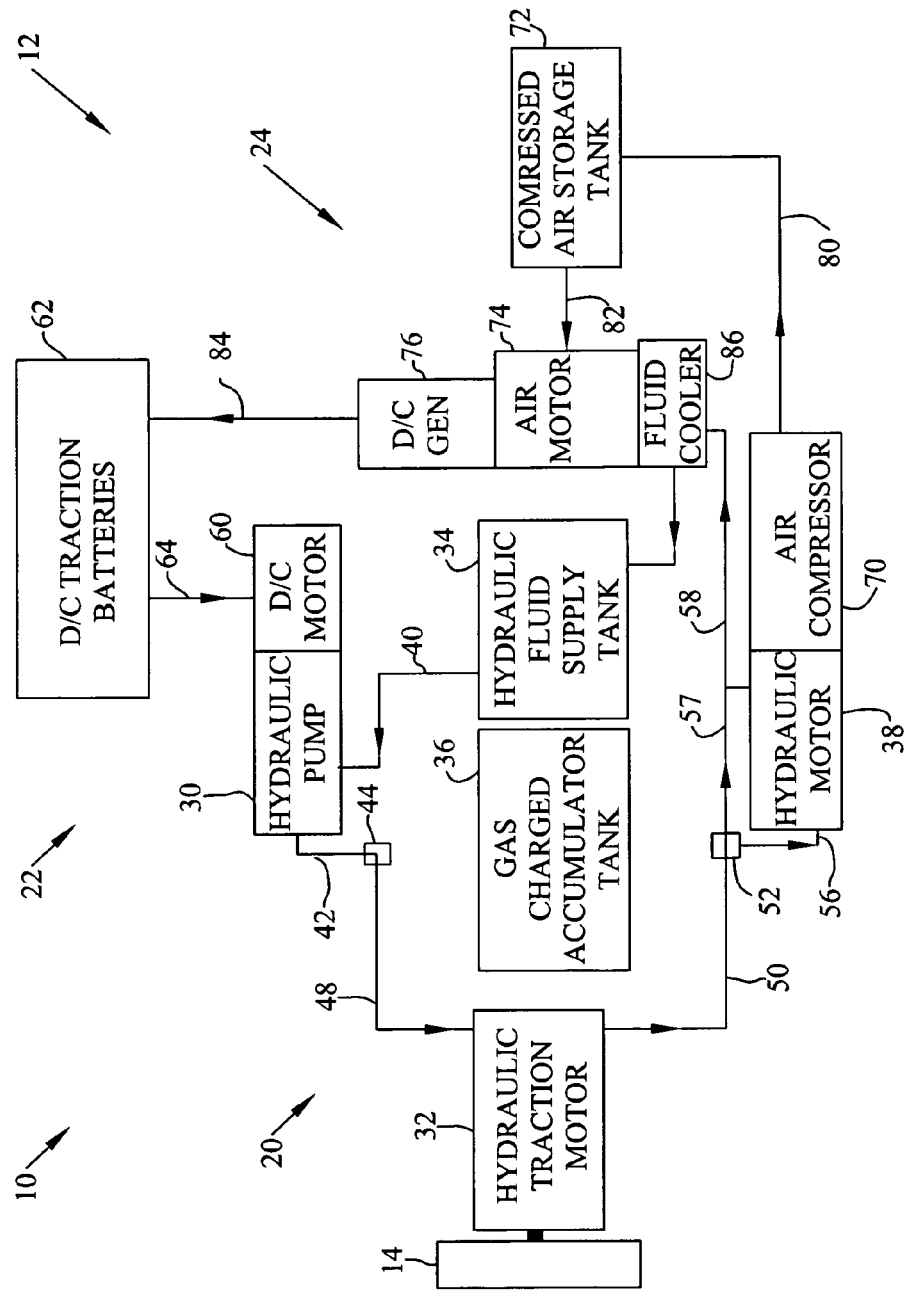
FIG. 3 is a schematic diagram of the fluid drive system of FIG. 1 showing an aspect of the operation of the system while the vehicle is cruising or in continued acceleration.

During periods of continued acceleration or for maintaining a cruising speed when the pressurized fluid in accumulator tank 36 has been dissipated, the operation of fluid drive system 10 will then be as shown in FIG. 3. After the pressurized fluid in accumulator tank 36 has been used, valve 44 closes off fluid supply line 47 and opens fluid supply line 42 to supply pressurized fluid from hydraulic pump 30 to power hydraulic motor 32. As noted above, hydraulic pump 30 is driven by D/C motor 60, which receives electrical power from battery array 62 through electrical lines 64. While D/C motor 60 is driving hydraulic pump 30 to power hydraulic motor 32, hydraulic fluid exiting hydraulic motor 32 will be directed through fluid outlet lines 50 and bypass line 57 back into fluid supply tank 34 through fluid return line 58. Alternately, the hydraulic fluid may be directed through hydraulic motor 38 while vehicle 12 is being powered by battery array 62 without operating air compressor 70. However, it should be appreciated that any compressed air in storage tank 72 can still be used during this time to drive air motor 74 and D/C generator 76 to recharge battery array 62 at the same time the batteries are providing electrical power to D/C motor 60. Also, as long as air motor 74 is operating, the exhaust air will provide a cooling effect to the hydraulic fluid traveling through fluid return line 58 as it passes through fluid cooler 86.

Figure 4:
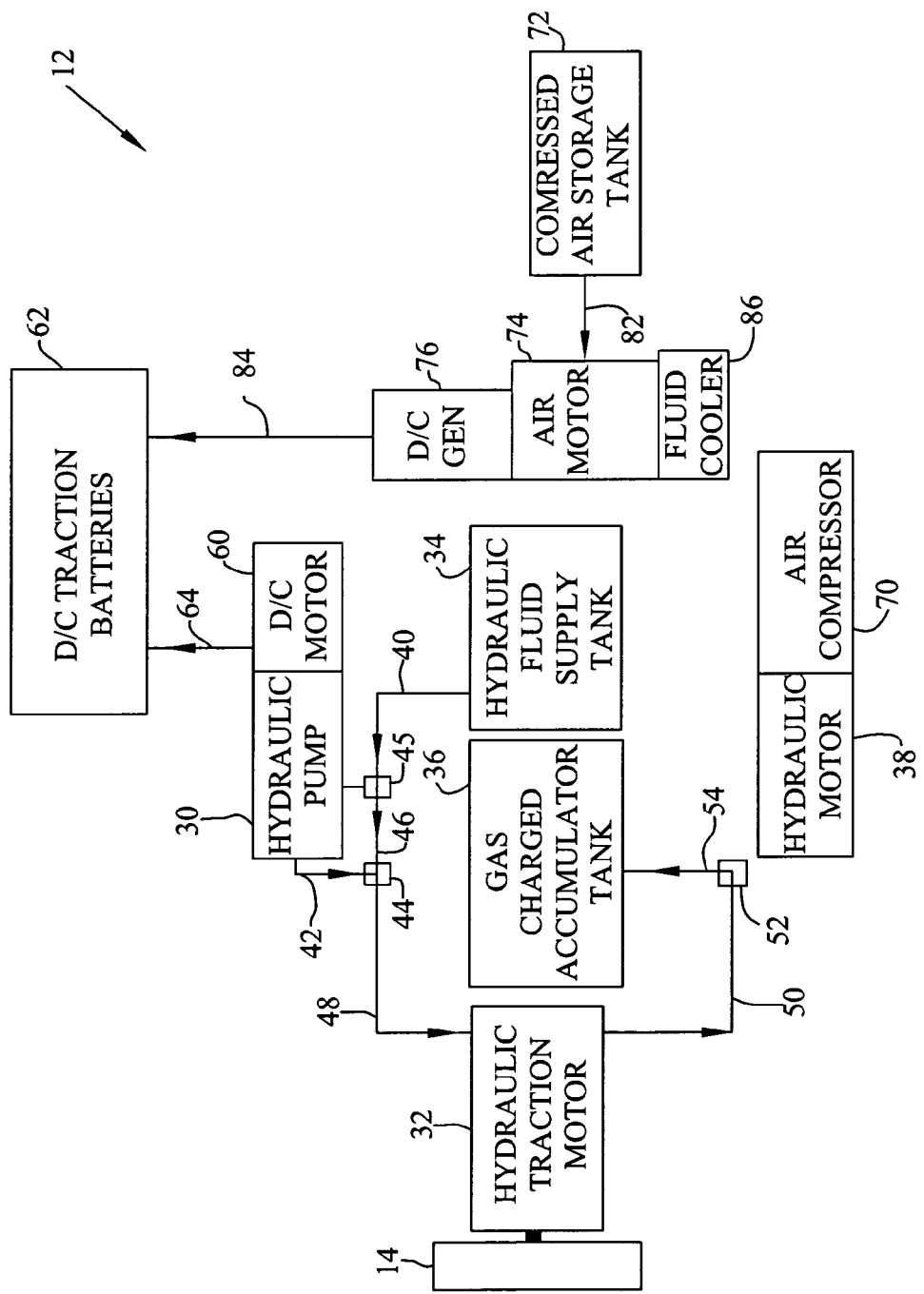
FIG. 4 is a schematic diagram of the fluid drive system of FIG. 1 showing an aspect of the operation of the system while the vehicle is decelerating.

Now referring to FIG. 4, upon deceleration of vehicle 12, hydraulic traction motor 32 is driven by wheel 14, which allows hydraulic motor 32 to act as a pump and assist in helping to brake the vehicle. While acting as a pump, hydraulic motor 32 may pump hydraulic fluid directly from hydraulic fluid supply tank 34 through fluid line 46 as directed by valve 45. Alternately, valve 45 may direct hydraulic fluid through hydraulic pump 30, which in turn can be used drive D/C motor 60 to act as a generator for recharging battery array 62. Hydraulic fluid exiting hydraulic motor/pump 32 is initially routed into pneumatically charged accumulator tank 36 by valve 52 and through fluid line 54. Hydraulic fluid continues to fill accumulator tank 36 during deceleration until such time that the tank is fully pressurized.

Figure 5:
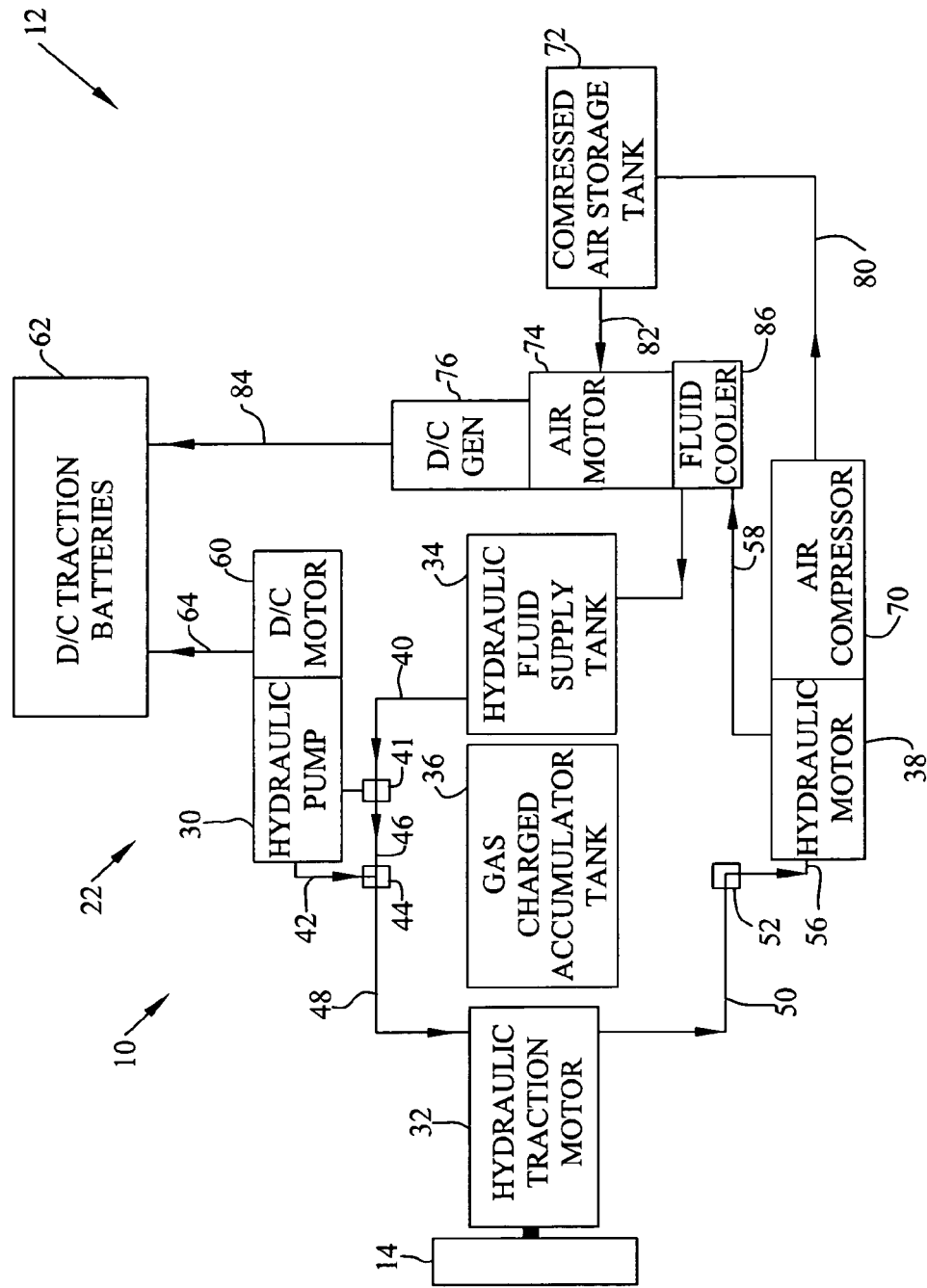
FIG. 5 is a schematic diagram of the fluid drive system of FIG. 1 showing an aspect of the operation of the system during a secondary deceleration period.

When accumulator tank 36 becomes fully pressurized, fluid drive system 10 then goes into a secondary deceleration operation for capturing the kinetic energy of vehicle 12 as shown in FIG. 5. In the secondary deceleration operation, hydraulic motor/pump 32 continues to draw fluid directly from supply tank 34 or through hydraulic pump 30 as discussed above. However, once accumulator tank 36 is fully pressurized, valve 52 then diverts the hydraulic fluid through branch outlet line 56 into hydraulic motor 38. Hydraulic motor 38 then drives air compressor 70 to supply compressed air to storage tank 72. As discussed above, compressed air in storage tank 72 is used to power air motor 74 and D/C generator 76 to recharge battery array 62. Also, as discussed above, air motor 74 can continue to be used to cool hydraulic fluid returning to supply tank 34 as the fluid return line 58 passes through fluid cooler 86.

Figure 6:
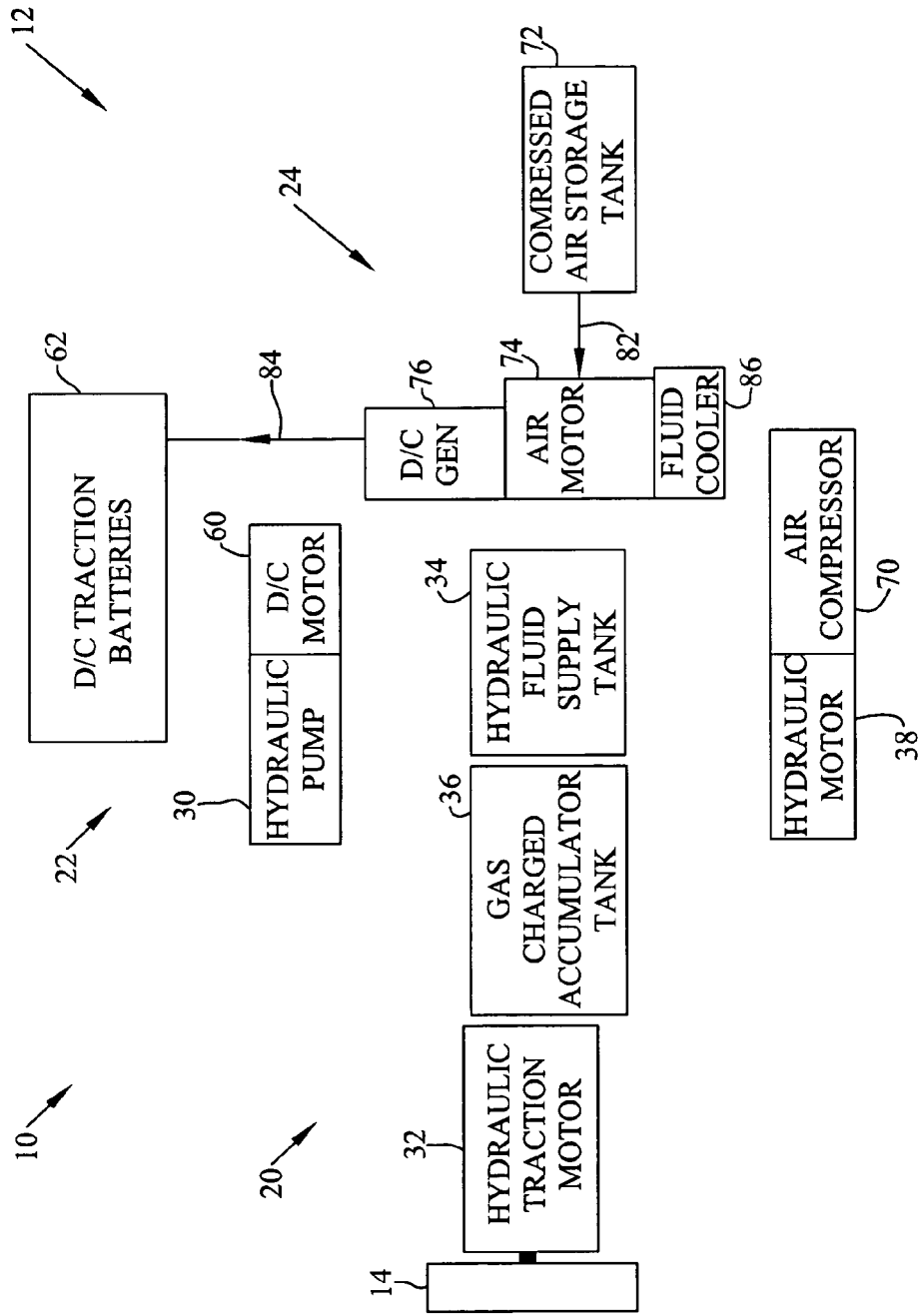
FIG. 6 is a schematic diagram of the fluid drive system of FIG. 1 shown when the vehicle is motionless.

When vehicle 12 comes to a stop, operation of fluid drive system 10 comes to a stop as shown in FIG. 6 except that any compressed air stored in storage tank 72 can continue to be used to drive air motor 74 and D/C generator 76 to recharge battery array 62. At such time as the vehicle is accelerated again, pressurized fluid in accumulator tank 36 will again provide the initial acceleration as discussed above and shown in FIG. 2. If there is not pressurized fluid in accumulator tank 36 or if the pressurized fluid is used up, vehicle 12 will be accelerated and powered by the batteries as shown in FIG. 3.

It should be appreciated that the above system can supply charging current to the array of batteries 62 during all three driving cycles (accelerating, decelerating and when stopped) because air motor 74 can be operated independently of the rest of the system using compressed air stored in storage tank 72.

Figure 7:
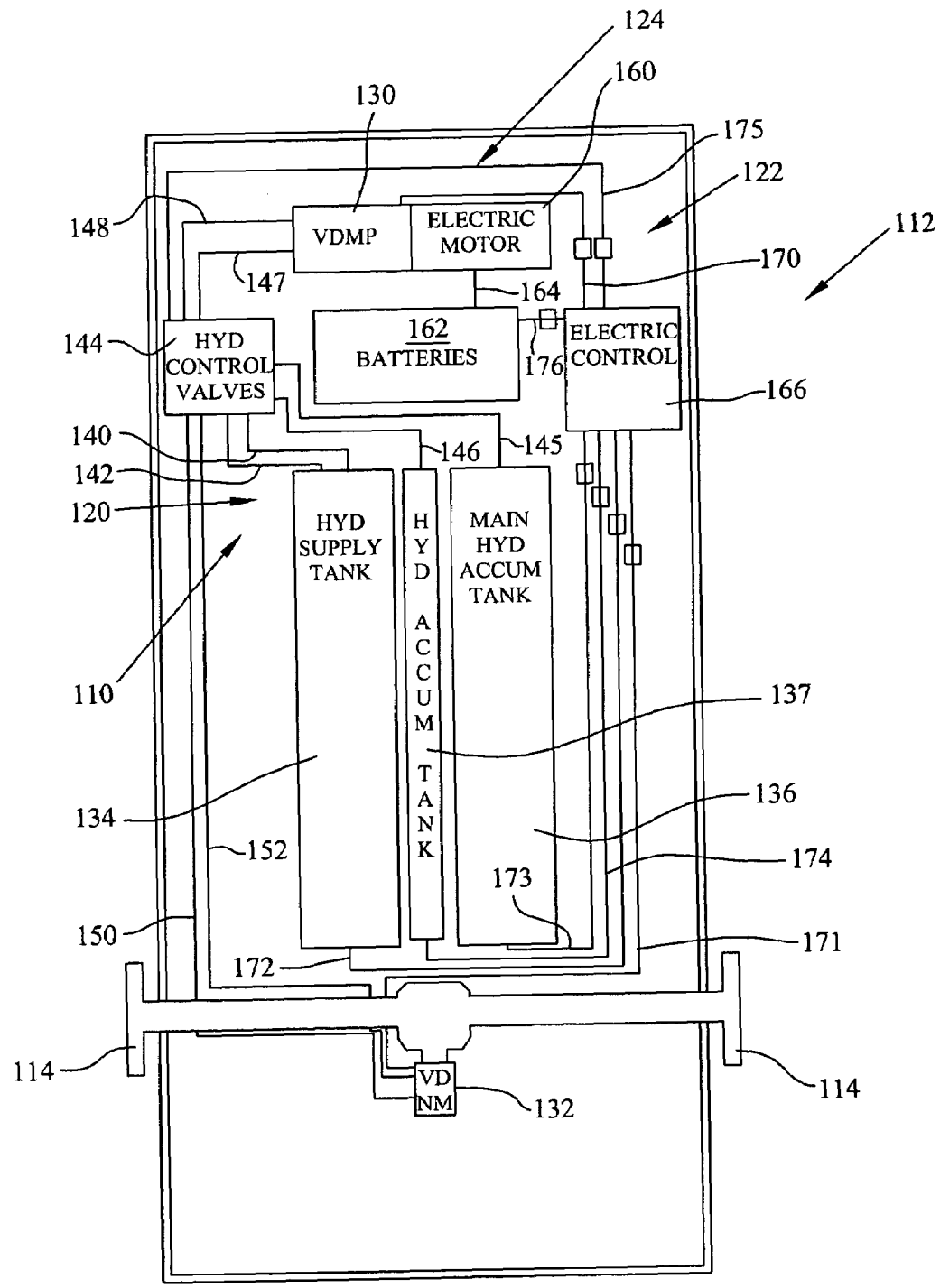
FIG. 7 is a schematic diagram of the fluid drive system of another embodiment of the present invention having energy regeneration and storage capabilities.
Figure 8:
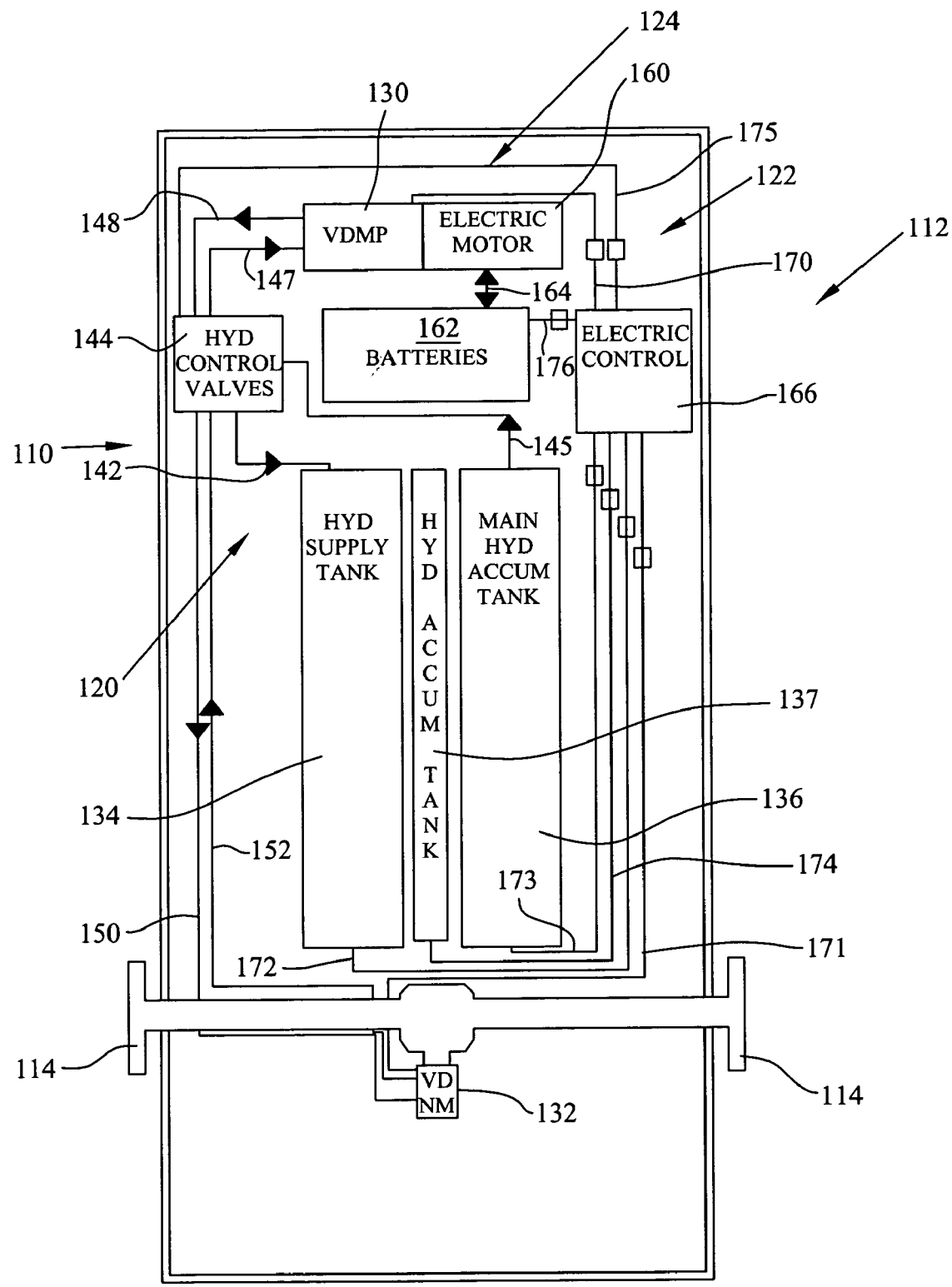
FIG. 8 is a schematic diagram of the fluid drive system of FIG. 7 showing an aspect of the operation of the system during acceleration.

Referring now to FIG. 7, another embodiment of a fluid drive system generally indicated as 110 is used to drive or propel a vehicle generally indicated as 112 that includes drive wheels 114. Drive system 110 has energy regeneration storage capabilities and includes fluid or hydraulic components generally indicated as 120, electrical energy supply and drive components generally indicated as 122, and an electrical regeneration system generally indicated as 124 for regenerating the electrical energy supply.

Fluid components 120 include a variable displacement hydraulic pump 130, a variable displacement hydraulic motor 132, a hydraulic fluid storage tank 134, a second hydraulic fluid supply tank 136, and a third hydraulic fluid supply tank 137, all of which are known. In the embodiment shown, hydraulic fluid supply tanks 136 and 137 are high pressure gas or pneumatically charged accumulator tanks for storing pressurized hydraulic fluid. In the embodiment shown, accumulator tank 137 has a smaller capacity than accumulator tank 136 for reasons set forth below; however, it should be realized that any desired capacity may be selected for either accumulator tank. Supply tank 134 is a low pressure reservoir-type hydraulic tank. Hydraulic motor 132 is powered by hydraulic fluid received from one of hydraulic pump 130 or, accumulator tanks 136 or 137 as discussed in further detail below.

Fluid drive system 110 also includes numerous fluid or hydraulic lines and valves for connecting fluid components 120. The fluid lines include a fluid feed line 140 and fluid return 142 connecting hydraulic fluid supply tank 134 and a set of master control valves 144. The system also includes fluid lines 145 and 146 connecting accumulator tanks 136 and 137, respectively, to master control valves 144. In addition, the system includes a fluid supply line 147 and a fluid return line interconnecting master control valves 144 and variable displacement hydraulic pump 130. The system also includes a fluid supply line 150 and fluid return line 152, interconnecting master control valves 144 and variable displacement hydraulic motor 132.

Electrical energy supply and drive components 122 include a DC electric motor 160 for driving hydraulic pump 130 and a battery array 162 for providing electrical energy to DC motor 160. Battery array 162 may include lead acid, nickel hydride, or lithium ion batteries. Electrical lines 164 connect battery array 162 to DC motor 160. An electronic control system 166 is also included for controlling the operation of fluid drive system 110. Electronic control system 166 is connected to hydraulic pump 130, hydraulic motor 132, supply tank 134, accumulator tank 136, accumulator tank 137, master control valves 144, and battery array 162 with electrical lines 170, 171, 172, 173, 174, 175, and 176, respectively. Electronic control system 166 may also be used to oversee the monitoring of pedal positions, accumulator tank pressures, and vehicle speed and can also control the hydraulic flow valves, swash plate angles and overall charging system operation.

The operation of fluid drive system 110 can best be appreciated by referring to FIGS. 8–11. Now referring to FIG. 8, during the initial acceleration, vehicle 112 will operate similar to vehicle 12 in that power is provided by hydraulic fluid from pneumatically charged accumulator tank 136, provided there is an initial charge of pressurized hydraulic fluid in the tank. Electronic control system 166 can control master control valves 144 to provide pressurized hydraulic fluid from accumulator tank 136 directly to hydraulic motor 132 through fluid supply lines 145 and 150, or hydraulic fluid from accumulator tank 136 may be routed to hydraulic pump 130 through fluid supply lines 145 and 147 prior to directing the fluid to hydraulic motor 132 through fluid lines 148 and 150. Routing pressurized hydraulic fluid through hydraulic pump 130 will cause the hydraulic pump to act as a motor and turn electric motor 160, which will act as a generator and recharge battery array 162 with pressurized fluid from accumulator tank 136 while simultaneously providing acceleration to drive wheels 114. Hydraulic fluid exiting hydraulic motor 132 travels through fluid return line 152 and is routed by master control valves 144 through fluid return line 142 to supply tank 134.

Figure 9:
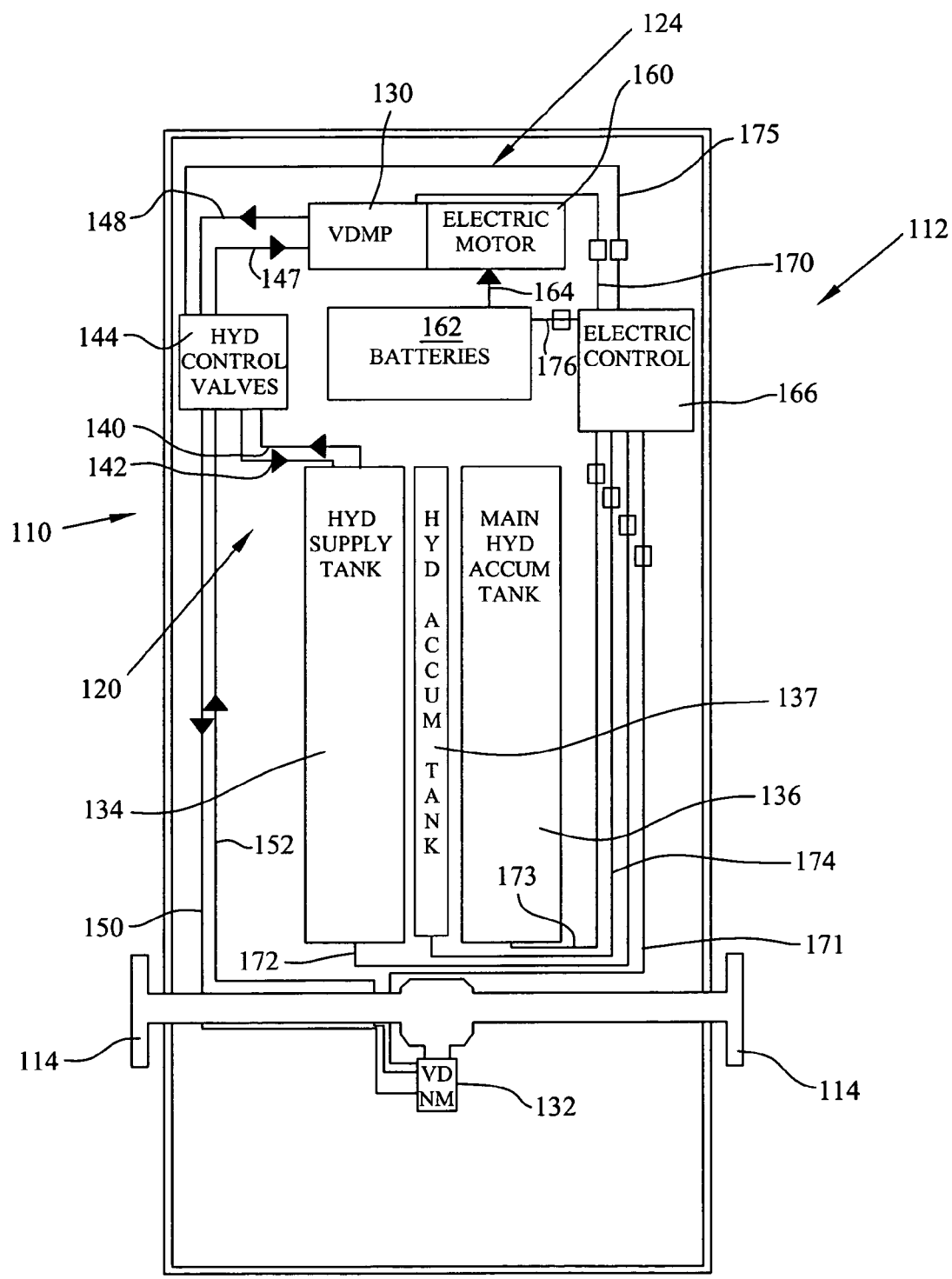
FIG. 9 is a schematic diagram of the fluid drive system of FIG. 7 showing an aspect of the operation of the system while the vehicle is cruising or in continued acceleration.

During periods of continued acceleration or for maintaining a cruising speed, when the pressurized fluid in accumulator tank 136 has been dissipated, the operation of fluid drive system 110 will then be as shown in FIG. 9. After the pressurized fluid in accumulator tank 36 has been used, electronic control system 166 opens fluid supply line 140 and closes fluid line 145 while simultaneously causing battery array 162 to provide electric current to electric motor 160 for driving hydraulic pump 130. Hydraulic pump 130 pulls hydraulic fluid from supply tank 134 through fluid supply lines 140 and 147. The hydraulic pump then pumps the hydraulic fluid through fluid return line 148 into master control valves 144, which directs pressurized hydraulic fluid to hydraulic motor 132 through fluid supply line 150. It should be noted that this phase of operation of vehicle 112 is also similar to that of vehicle 12. Fluid exits hydraulic motor 132 and proceeds through fluid return line 152 and 142 to be returned to supply tank 134.

Figure 10:
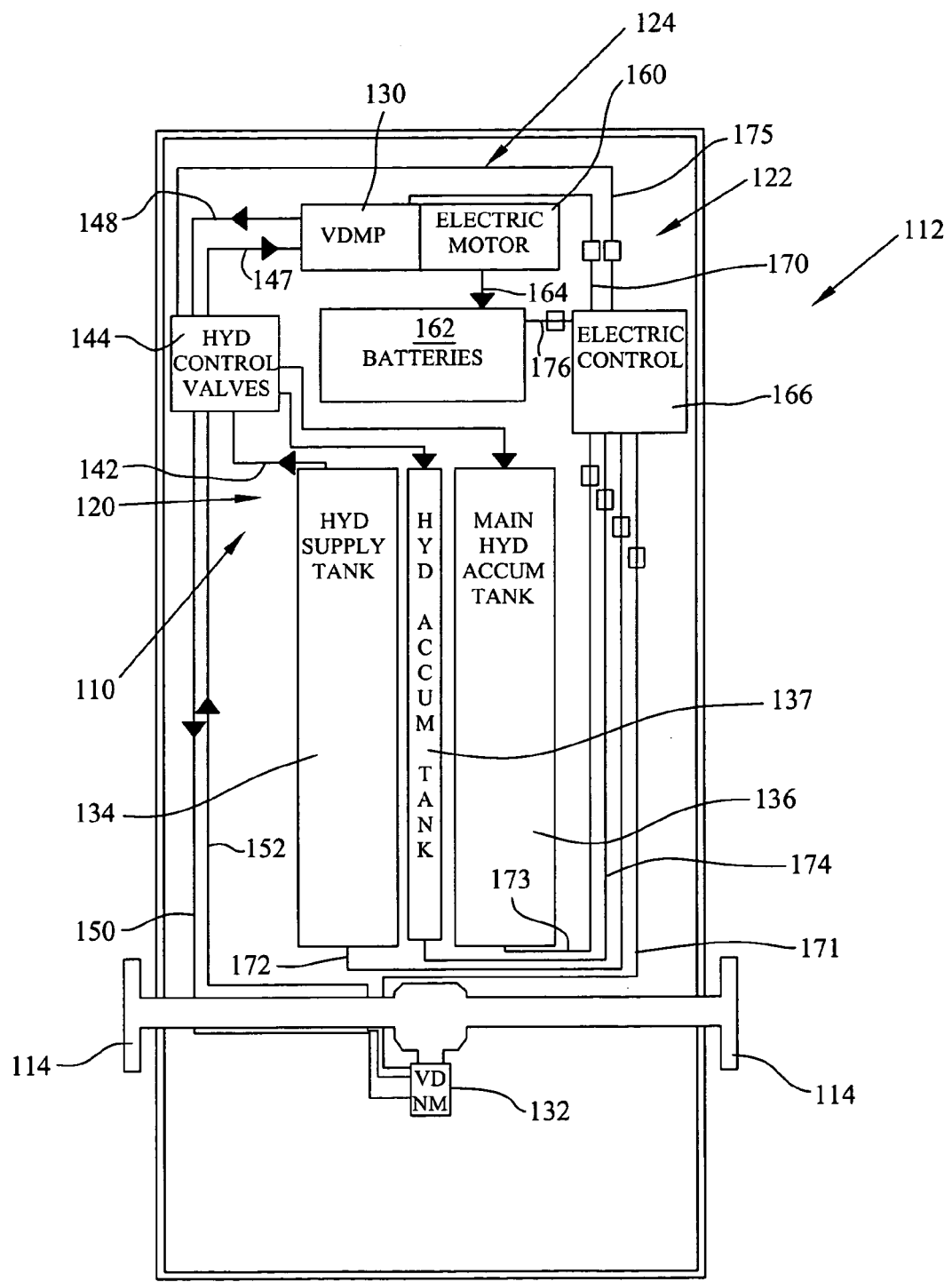
FIG. 10 is a schematic diagram of the fluid drive system of FIG. 7 showing an aspect of the operation of the system while the vehicle is decelerating.

Now referring to FIG. 10, upon deceleration of vehicle 112, variable displacement hydraulic motor 132 is driven by wheels 114, which allows hydraulic motor 132 to act as a pump and assist in braking the vehicle. During a deceleration period, hydraulic motor 132 continues to pull hydraulic fluid from supply tank 134 through the fluid supply lines as noted above and through hydraulic pump 130. As the fluid is drawn through hydraulic pump 130 it acts as a hydraulic motor and turns electric motor 160, which becomes a generator to charge battery array 162. In addition, when electronic control system 166 senses deceleration, it causes master control valves 144 to close fluid return line 142 to supply tank 134 and routes the hydraulic fluid to accumulator tanks 136 and 137 through fluid lines 145, 146, respectively. Fluids stored in accumulator tanks 136 and 137 will be under pressure thereby storing the kinetic energy from decelerating vehicle 112. Fluid may be directed equally into accumulator tanks 136 and 137 or priority may be given to accumulator tank 136 as this tank is used to store hydraulic energy for take off assistance and recharging the batteries as discussed above. Of course, if fluid is provided equally to the tanks, accumulator tank 137 will be filled before accumulator tank 136 because of the smaller capacity. As long as the vehicle 112 is stopped, accumulator tank 137 will continue to charge battery array 162 as long as the accumulator has stored energy. In addition, the primary accumulator tank 136 may also be used to power the charging circuit for a longer stop period such as overnight or while the driver is at work. The energy in the accumulator tanks may also be used to operate other accessories.

It should also be realized that electronic control system 166 may be used to adjust displacement of one or both variable displacement hydraulic pump 130 and variable displacement hydraulic motor 132 in order to achieve the maximum possible kinetic energy retrieval between storage and use in the accumulator tanks and regenerative braking. The variable displacement pumps/motors also contribute to increased efficiency and control of the fluid drive recharging system. For example, the volume in hydraulic pump 130 can be controlled while the vehicle is accelerating to control the RPMs and thus the charging rate of battery array 162. By contrast, by controlling the volume of variable displacement hydraulic motor/pump 132, the applied torque and thus the RPM of the vehicle's wheels can be controlled. It should be realized that the displacement that is set between variable displacement motor/pump 130 and 132 will define the ratio of the revolutions that the pumps turn relative to one another. Furthermore, the ratio can be changed during the operation of the vehicle so that as the volume of hydraulic motor/pump 132 decreases relative to the volume of hydraulic motor/pump 130, the vehicle speed will be increased while it is in a continuous acceleration or maintaining a cruising speed cycle. For instance, the initial volume of the hydraulic motor/pump 130 may be set at one-tenth the volume of the hydraulic motor/pump 132. This means that hydraulic motor/pump 130 has to turn ten revolutions before it fills the volume of hydraulic motor/pump 132 so that motor/pump 130 will turn ten times faster or at a ratio of 10:1 relative to motor/pump 132. Once a ration of 1:1 is achieved between hydraulic motor/pumps 130 and 132, the displacement of hydraulic motor/pump 130 can be further increased to achieve overdrive. Accordingly, this ratio can be changed between hydraulic motor/pumps 130 and 132 to achieve the desired speed and rate of acceleration.

The ratio of the volume between hydraulic motor/pumps 130 and 132 can also be changed during deceleration in the same manner and may be changed from an overdrive condition during cruising to a condition where the volume in motor/pump 132 exceeds that in motor/pump 130. This is because during deceleration, hydraulic motor/pump 132 becomes the driving force that drives hydraulic motor/pump 130 wherein the ratios between the volumes of the pumps is set in such a manner as to achieve the required torque and RPM of the generator for the application. For instance, during deceleration, the displacement of the motor/pumps may again be changed to so that motor/pump 132 has a volume ten times larger than motor/pump 130, and wherein motor/pump 130 turns ten revolutions for each revolution of motor/pump 132 providing a ratio of 10:1. Having the volume of motor/pump 132 larger than the volume of motor/pump 130 may be preferable during deceleration and regenerative braking because the generating speed of electric motor/generator 160 is limited by the RPMs of the wheels. As vehicle 112 slows, the ratios between hydraulic motor/pumps 130 and 132 are preferably varied to maintain the output of electric motor/generator 160 at a steady level. Also during deceleration cycle, the hydraulic fluid is routed to accumulators 136 and 137, and when the speed of vehicle 112 no longer supports the ability to keep the revolutions per minute of electric motor/generator 160 at the desired level, controller 166 opens the corresponding valve of master control valves 144 to allow accumulator 137 to send pressurized fluid to hydraulic motor/pump 130 to maintain the charging rate of electric motor/generator 160 after vehicle 112 has come to a stop.

The concept of the use of variable displacement hydraulic motor/pumps in the present invention is somewhat analogous to that of continuously variable transmissions, which are known for use in automobiles. However, continuously variable transmissions do not offer the advantage of the present invention as it would not be desirable to have an internal combustion engine running at high RPMs during deceleration. The concept is very beneficial though for regenerative braking of electric vehicles to increase the performance and efficiency of the regenerative braking system. In addition, through the use of ratios, the effect of a large current draw that may be a problem with other regenerative systems can be avoided. It should be noted that the electrical charging rates are determined by the designed size and use of the vehicle and the battery state of charge. As such, larger trucks should have a greater charging rate than smaller cars or other vehicles. Furthermore, in using ratios similar to that of a continuously variable transmission, a smaller battery array and electric motor may be utilized by using the ratios to accelerate the vehicle at acceptable levels and maintain the vehicle speed. In addition, during periods of maintaining a cruising speed, the ratios can be further changed to reduce the speed of the electric motor to reduce the amount of electric current required to operate the system.

Figure 11:
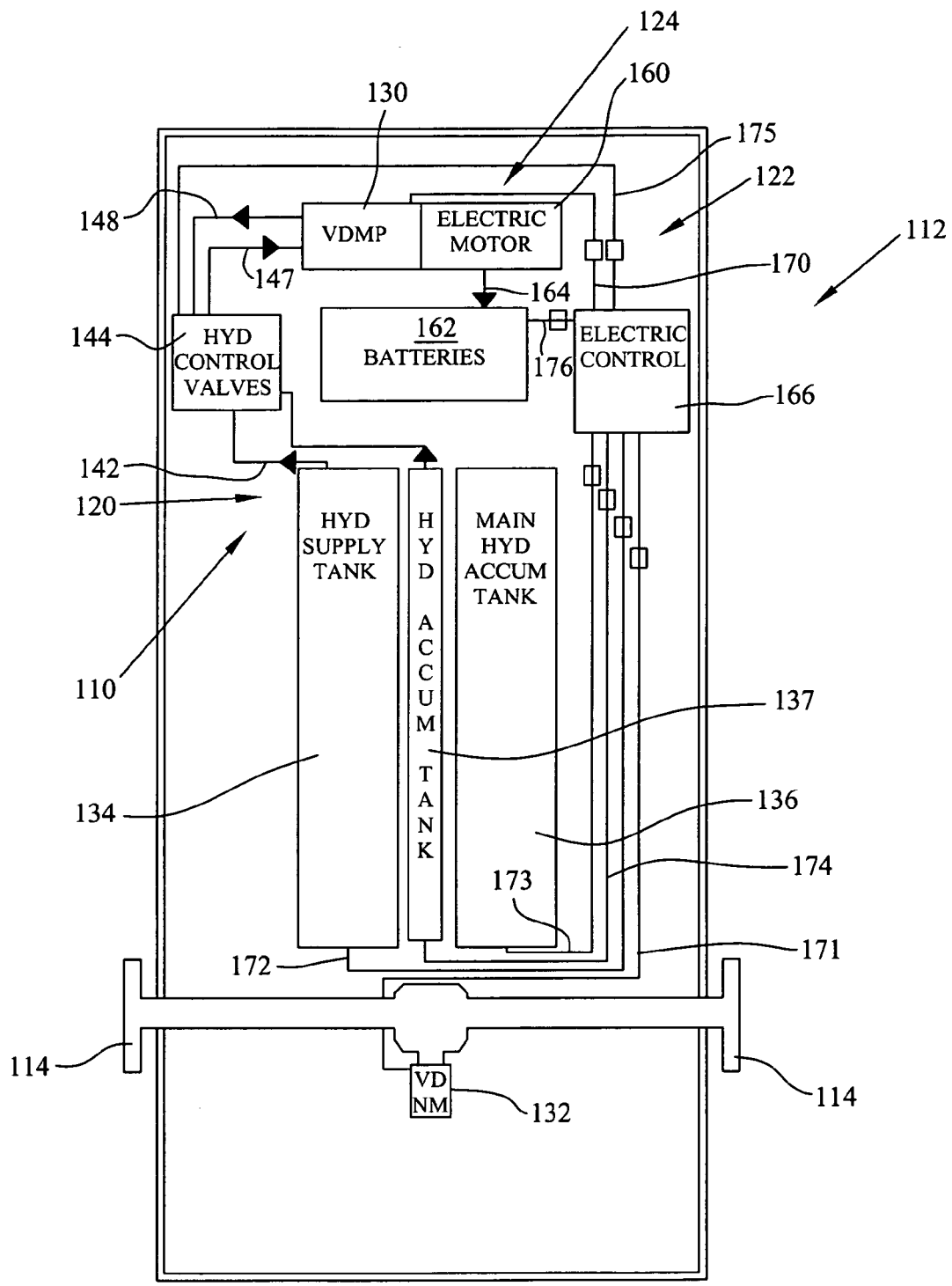
FIG. 11 is a schematic diagram of the fluid drive system of FIG. 7 when the vehicle is motionless.

Now referring to FIG. 11, when vehicle 112 comes to a stop, energy recycling system 110 can be used to continue to charge battery array 162 through the energy stored in hydraulic accumulator tank 137. Upon sensing a stop condition, electronic control system 166 controls master control valves 144 to direct pressurized hydraulic fluid from accumulator tank 137 through fluid line 146 into hydraulic pump 130 through fluid supply line 147. As during the deceleration cycle, hydraulic pump 130 will act as a motor to turn electric motor 160 and generate electricity to charge batteries 162. Fluid exits hydraulic pump 130 through fluid return line 148 and is routed to supply tank 134 through fluid return line 142. This provides a more steady rate of charge than is available through current regenerative braking systems. It should also be realized that the regenerative braking effect of the system is proportional to the braking input of the driver, and that pressurized hydraulic fluid will only be stored in the accumulator tanks during an applied braking effort. Otherwise, fluid is returned to supply tank 134.

It should also be realized that mechanical pressure release valves (not shown) may be included in the system to address safety concerns in the event of an electronic pressure transducer monitoring failure. It should also be appreciated that heat from the hydraulic fluid may be used to provide heat for the interior of the vehicles with little or no electrical drain on the batteries and should require less warm up time than antifreeze in conventional vehicles.

Figure 12:
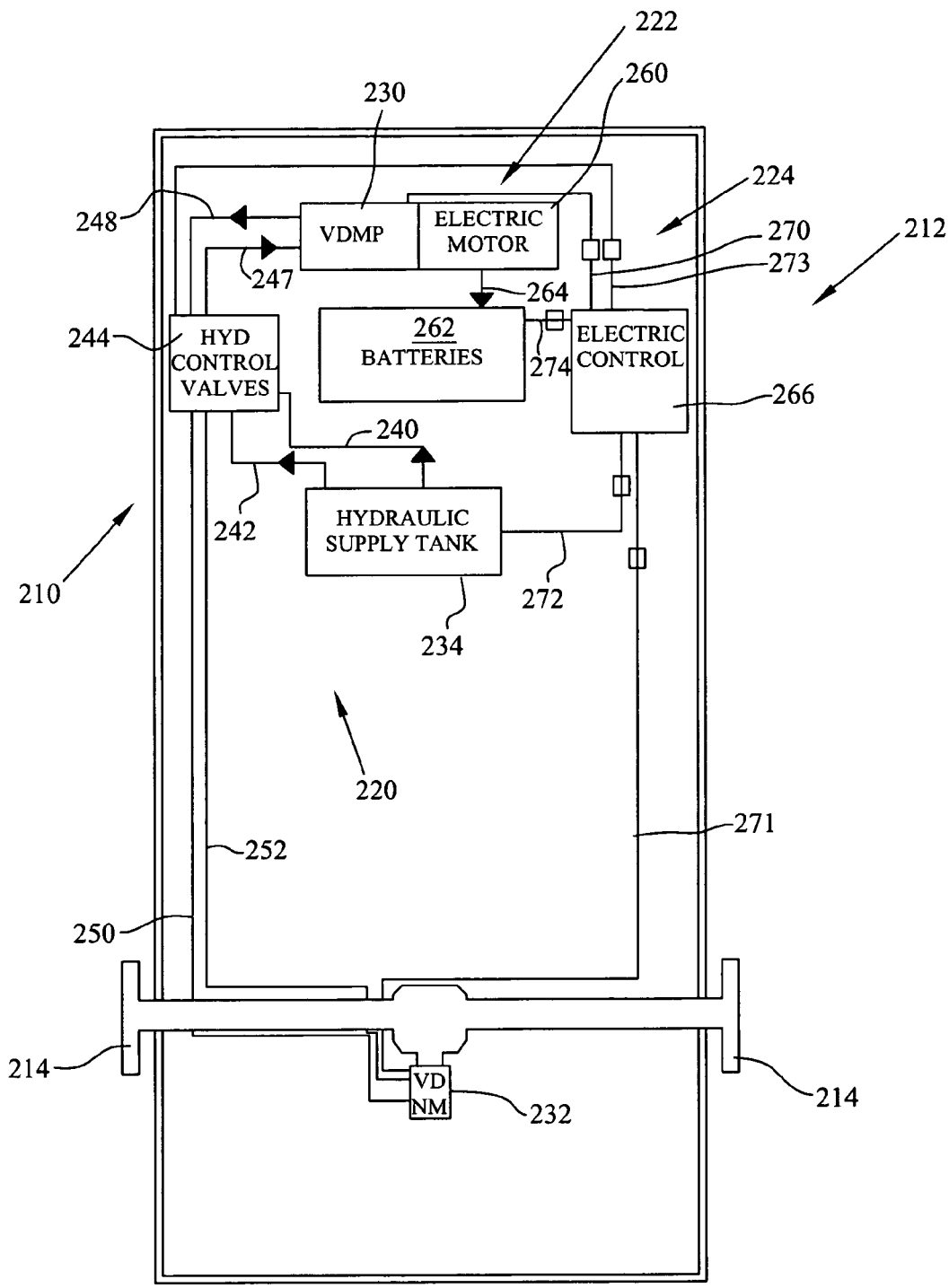
FIG. 12 is a schematic diagram of a different embodiment of a fluid drive system according to the present invention having energy regeneration and storage capabilities.

Now referring to FIG. 12, still another embodiment of a fluid drive system is generally indicated as 210 and is used to propel the vehicle generally indicated as 212 that includes drive wheels 214. Drive system 210 has energy regeneration storage capabilities and includes fluid hydraulic components generally indicated as 220, the electrical energy supply and drive components generally indicated as 222, an electrical regeneration system generally indicated as 224 for regenerating electrical energy supply.

This embodiment is particularly suited for use in many applications and would allow for miniaturization and manufacturing with lighter materials for use with other drives, whether with or without accumulator usage. In addition to electric automobiles, vehicle 212 may include but is not limited to scooters, dirt and street bikes, three and four wheel all terrain vehicles and NEV's, utility vehicles, utility trucks, public and private buses, recreational vehicles, military vehicles, locomotives and rail vehicles, waverunners and jet skis, personal boats and other boats. Aviation applications may also be possible wherein vehicle 212 is a small aircraft such as ultralights, personal transport and other applications.

Fluid components 220 include a variable displacement hydraulic pump 230, a variable displacement hydraulic motor 232, and a hydraulic fluid supply tank 234. Supply tank 234 is a low pressure reservoir-type tank, and hydraulic motor 232 is powered by hydraulic fluid received from hydraulic pump 230 as discussed in further detail below.

Fluid drive system 210 also includes numerous fluid or hydraulic lines and valves for connecting fluid components 220. The fluid lines include a fluid feed line 240 and a fluid return line 242 interconnecting supply tank 234 to a set of master control valves 244. The system also includes a fluid supply line 147 and a fluid return line 148 interconnecting variable displacement hydraulic pump 230 with master control valves 244. In addition, the system includes a fluid supply line 250 and a fluid return line 252 connected between variable displacement hydraulic motor 232 and master control valves 244.

Electrical energy supply and drive components 22 and electrical regeneration system 24 include a DC electric motor 260 for driving hydraulic pump 230 and a battery array 262 for providing electrical energy to DC motor 260. As with the previous embodiments, battery array 262 may include lead acid, nickel hydride, lithium ion or other types of batteries. Electrical lines 264 are provided to connect battery array 262 to DC motor 260. An electronic control system 266 is also provided in this embodiment for controlling fluid drive system 210. Electronic control system 266 is electrically connected to variable displacement hydraulic pump 230, variable displacement hydraulic motor 232, supply tank 234, master control valves 244, and battery array 262 with electrical lines 270–274, respectively.

In operation, fluid drive system 210 provides propulsion using battery array 262, which provide an electrical current to DC motor 260. In turn, DC motor 260 drives variable displacement hydraulic pump 230. Hydraulic pump 230 pulls hydraulic fluid from tank 234 through fluid lines 240 and 247 and pumps the hydraulic fluid to variable displacement hydraulic motor 232 through fluid lines 248 and 250. Hydraulic motor 232 drives wheels 214 or other propulsion mechanism, such as a propeller (not shown) for propelling vehicle 212. Hydraulic fluid exiting hydraulic motor 232 is returned to hydraulic supply tank 234 through fluid lines 252 and 242.

A deceleration cycle of vehicle 212 is sensed by electronic control system 266, wherein fluid drive system 210 reverts to an energy regeneration system. During deceleration, drive wheels 214 or other propulsion mechanism drives hydraulic motor 232, which now acts as a hydraulic pump. Hydraulic motor/pump 232 pulls hydraulic fluid from supply tank 234 in the same above-described fluid lines and variable displacement hydraulic pump 230, which now acts as a motor. Hydraulic motor/pump 232 drives electric motor 260, which acts as a generator to recharge battery array 262.

While the invention has been taught with specific reference to the above described embodiments, one skilled in the art will recognize that changes can be made in form and detail without departing from the spirit and scope of the invention. For example, the energy supply source may include other types of batteries in addition to lithium-ion such as lead acid batteries, metal-hydrate nickel batteries, or any other known electrical energy storage device. Also, a single combined fluid supply tank that serves both as a reservoir and hydraulic accumulator system may be used instead of the duel tanks shown.

Additionally, although a single hydraulic motor is shown for driving the wheels, it should be appreciated that additional hydraulic motors may be included with the system to drive two or more wheels of the vehicle. Such additional hydraulic motors may be driven with fluid supplied by the above mentioned tanks or additional hydraulic tanks, pumps and motors may be included. It should also be appreciated that the concept of the variable displacement hydraulic motor/pumps can be used with other mechanisms such as an air compressor to obtain similar benefits. As such, the described embodiments are to be considered in all respects only as illustrative and not restrictive. The scope of the invention is therefore, indicated by the following claims rather than by the description or drawings.

What is claimed is:

1. A fluid drive system having energy regeneration and storage capabilities for driving a vehicle comprising:
   an electrical energy supply source mounted on the vehicle;
   at least one electrical motor electrically connected to said electrical supply source;
   a hydraulic pump driven by said electrical motor;
   a low pressure hydraulic fluid supply tank supplying fluid to said hydraulic pump;
   a pneumatically charged accumulator tank for storing pressurized hydraulic fluid;
   a combination hydraulic motor and pump being alternately driven by hydraulic fluid from said hydraulic pump and said pneumatically charged accumulator tank; and
   an electrical regeneration system for regenerating said electrical energy supply, said electrical regeneration system powered by hydraulic fluid pumped by said combination hydraulic motor and pump.

2. The fluid drive system having energy regeneration and storage capabilities as set forth in claim 1, wherein said combination hydraulic motor and pump propels the vehicle during acceleration and speed maintaining operations.

3. The fluid drive system having energy regeneration and storage capabilities as set forth in claim 2, wherein the combination hydraulic motor and pump serves as a braking mechanism during deceleration of the vehicle.

4. The fluid drive system having energy regeneration and storage capabilities as set forth in claim 3, wherein said combination hydraulic motor and pump pumps hydraulic fluid into said pneumatically charged accumulator tank during at least a portion of the time that the vehicle is decelerating.

5. The fluid drive system having energy regeneration and storage capabilities as set forth in claim 4, wherein said combination hydraulic motor and pump pumps hydraulic fluid for powering said electrical regeneration system when said pneumatically charged accumulator tank is fully pressurized.

6. The fluid drive system having energy regeneration and storage capabilities as set forth in claim 1, further including a second hydraulic motor, and wherein said electrical regeneration system includes an air compressor driven by said second hydraulic motor.

7. The fluid drive system having energy regeneration and storage capabilities as set forth in claim 6, wherein said electrical regeneration system further includes a compressed air storage tank, an air motor and an electrical generator, said air compressor providing compressed air to said compressed air storage tank, and compressed air from said compressed air storage tank drives said air motor.

8. The fluid drive system having energy regeneration and storage capabilities as set forth in claim 7, wherein said air motor drives said electrical generator to recharge said electrical energy supply source.

9. The fluid drive system having energy regeneration and storage capabilities as set forth in claim 8, wherein compressed air from said compressed air storage tank continues to drive said air motor and said electrical generator to recharge said electrical energy supply source after the vehicle has come to a stop.

10. The fluid drive system having energy regeneration and storage capabilities as set forth in claim 7, wherein said air motor cools the hydraulic fluid before being returned to said low pressure hydraulic fluid supply tank.

11. A fluid drive system having energy regeneration and storage capabilities for driving a vehicle comprising:
 an electrical energy supply source mounted on the vehicle;
 at least one electrical motor electrically connected to said electrical supply source;
 a hydraulic pump driven by said electric motor;
 at least one hydraulic fluid tank supplying fluid to said hydraulic pump;
 a first hydraulic motor connected to and propelling the vehicle;
 a second hydraulic motor; and
 an electrical regeneration system for regenerating said electrical energy supply, said second hydraulic motor driving said electrical regeneration system, and said electrical regeneration system including pneumatic components.

12. The fluid drive system having energy regeneration and storage capabilities as set forth in claim 11, wherein said pneumatic components include an air compressor, a compressed air storage tank, and an air motor, said air compressor providing compressed air to said compressed air storage tank, and compressed air from said compressed air storage tank driving said air motor.

13. The fluid drive system having energy regeneration and storage capabilities as set forth in claim 12, wherein said air compressor is driven by said second hydraulic motor.

14. The fluid drive system having energy regeneration and storage capabilities as set forth in claim 11, wherein said electrical regeneration system includes an air motor, and said air motor cools the hydraulic fluid before being returned to said hydraulic fluid tank.

15. The fluid drive system having energy regeneration and storage capabilities as set forth in claim 11, wherein said hydraulic fluid tank is a combined fluid reservoir and hydraulic accumulator system for both supplying hydraulic fluid to said first hydraulic motor and for storing pressurized fluid accumulated during periods of deceleration of the vehicle.

16. The fluid drive system having energy regeneration and storage capabilities as set forth in claim 11, further including a second hydraulic fluid tank, said second hydraulic fluid tank being a pneumatically charged accumulator tank for storing pressurized hydraulic fluid.

17. The fluid drive system having energy regeneration and storage capabilities as set forth in claim 16, wherein said first hydraulic motor serves as a pump when the vehicle is decelerating and pumps hydraulic fluid into said second hydraulic fluid tank.

18. The fluid drive system having energy regeneration and storage capabilities as set forth in claim 17, wherein said first hydraulic motor pumps hydraulic fluid to power said second hydraulic motor during at least a portion of the time that the vehicle is decelerating.

19. A fluid drive system having energy regeneration and storage capabilities for driving a vehicle comprising:
 an electrical energy supply source mounted on the vehicle;
 at least one electrical motor electrically connected to said electrical supply source;
 a hydraulic pump driven by said electric motor;
 at least one hydraulic fluid tank supplying fluid to said hydraulic pump;
 a combination hydraulic motor and pump drivingly connected to and driving a wheel of the vehicle; and
 an electrical regeneration system including an air motor for regenerating said electrical energy supply, said electrical regeneration system powered by hydraulic fluid from said combination electrical motor and pump, and said air motor cooling the hydraulic fluid before being returned to said hydraulic fluid tank.

20. The fluid drive system having energy regeneration and storage capabilities as set forth in claim 19, wherein said electrical regeneration system further includes an air compressor, a compressed air storage tank, and an electrical generator, said air compressor providing compressed air to said compressed air storage tank, and compressed air from said compressed air storage tank driving said air motor.

21. The fluid drive system having energy regeneration and storage capabilities as set forth in claim 20, wherein said air motor drives an electrical generator to recharge said electrical energy supply source.

22. The fluid drive system having energy regeneration and storage capabilities as set forth in claim 19, further including a second hydraulic fluid tank being a pneumatically charged accumulator tank for storing pressurized hydraulic fluid, said first hydraulic motor functioning as a pump during deceleration of the vehicle and pumping hydraulic fluid into said second hydraulic fluid tank.

23. The fluid drive system having energy regeneration and storage capabilities as set forth in claim 22, wherein during initial acceleration of the vehicle, fluid is first supplied from said second hydraulic fluid tank for powering said first hydraulic motor and subsequently from said hydraulic pump driven by said electric motor when pressurized fluid has been exhausted from second hydraulic fluid tank.

24. The fluid drive system having energy regeneration and storage capabilities as set forth in claim 22, wherein said first hydraulic motor pumps hydraulic fluid for powering said second hydraulic motor when said second hydraulic fluid tank is fully pressurized.

25. The fluid drive system having energy regeneration and storage capabilities as set forth in claim 19, wherein said electrical regeneration system continues to regenerate said electrical energy supply system after the vehicle has come to a stop.

26. The fluid drive system having energy regeneration and storage capabilities as set forth in claim 25, wherein said electrical energy supply system includes an air compressor that provides power to recharge said electrical energy supply source after the vehicle has come to a stop.

27. A fluid drive system having energy regeneration and storage capabilities for driving a vehicle comprising:
- an electrical energy supply source mounted onto a vehicle;
- at least one electrical motor electrically connected to said electrical energy supply source;
- at least two combination hydraulic pump/motors, one of said hydraulic pump/motors connected to said electric motor and said other hydraulic pump/motor propelling the vehicle;
- at least one hydraulic fluid tank supplying fluid to said hydraulic pump/motors; and
- an electrical regeneration system for regenerating said electrical energy supply, said other hydraulic pump/motor pumping hydraulic fluid to power said electrical regeneration system during at least a portion of the time that the vehicle is decelerating.

28. The fluid drive system having energy regeneration and storage capabilities as set forth in claim 27, wherein said other hydraulic pump/motor pulls hydraulic fluid from said fluid supply tank through said one hydraulic pump/motor during deceleration.

29. The fluid drive system having energy regeneration and storage capabilities as set forth in claim 28, wherein said one hydraulic pump/motor powers said electrical motor, which acts as a generator to recharge said electrical energy supply source while said other hydraulic pump/motor is providing power when the vehicle is decelerating.

30. The fluid drive system having energy regeneration and storage capabilities as set forth in claim 27, further including a second hydraulic fluid tank, said second hydraulic fluid tank being a pneumatically charged accumulator tank for storing pressurized hydraulic fluid.

31. The fluid drive system having energy regeneration and storage capabilities as set forth in claim 30, wherein said second hydraulic fluid tank stores pressurized hydraulic fluid from said other hydraulic pump/motor during at least a portion of the time that the vehicle is decelerating.

32. The fluid drive system having energy regeneration and storage capabilities as set forth in claim 31, wherein pressurized hydraulic fluid from said second hydraulic fluid tank is used to assist in accelerating the vehicle.

33. The fluid drive system having energy regeneration and storage capabilities as set forth in claim 32, wherein said pressurized hydraulic fluid in said second hydraulic fluid tank also causes said one hydraulic pump/motor to power said electric motor to regenerate electricity while also assisting with acceleration.

34. The fluid drive system having energy regeneration and storage capabilities as set forth in claim 33, wherein said hydraulic pump/motors are of a variable displacement type.

35. The fluid drive system having energy regeneration and storage capabilities as set forth in claim 34, further including a third hydraulic fluid tank, said third hydraulic fluid tank being a pneumatically charged accumulator tank for storing pressurized hydraulic fluid.

36. The fluid drive system having energy regeneration and storage capabilities as set forth in claim 35, wherein said third accumulator tank receives pressurized hydraulic fluid from said other hydraulic pump/motor during at least a portion of the time the vehicle is decelerating, and pressurized fluid from said third hydraulic fluid tank powers said one hydraulic pump/motor to turn said electric motor and recharge said electrical energy supply source during at least a portion of the time the vehicle is motionless.

37. The fluid drive system having energy regeneration and storage capabilities as set forth in claim 36, wherein said third hydraulic fluid tank has a smaller capacity than said second hydraulic fluid tank.

38. The fluid drive system having energy regeneration and storage capabilities as set forth in claim 27, wherein at least one of said hydraulic pump/motors is of a variable displacement type so that the relative speed between said motor/pumps can be controlled by varying the displacement.

* * * * *